(12) United States Patent
Chang (10) Patent No.: US 8,761,387 B2
(45) Date of Patent: Jun. 24, 2014

(54) ANALOG TRANSMIT CROSSTALK CANCELLER

(75) Inventor: Charles E. Chang, Coto DeCaza, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1565 days.

(21) Appl. No.: 11/800,433

(22) Filed: May 3, 2007

(65) Prior Publication Data

US 2008/0013742 A1  Jan. 17, 2008

Related U.S. Application Data (60) Provisional application No. 60/797,598, filed on May 4, 2006.

(51) Int. Cl.
*H04M 1/76* (2006.01)
*H04M 7/00* (2006.01)
*H04M 9/00* (2006.01)

(52) U.S. Cl.
USPC .......................................... 379/417; 270/201

(58) Field of Classification Search
USPC ................. 379/406.01–406.15, 417; 370/201
See application file for complete search history.

(56) References Cited

U.S. PATENT DOCUMENTS

| | | |
|---|---|---|
| 4,359,778 A | 11/1982 | Lee |
| 4,583,235 A | 4/1986 | Dömer et al. |
| 4,878,232 A | 10/1989 | Fisher |
| 4,956,838 A | 9/1990 | Gilloire et al. |
| 5,222,084 A | 6/1993 | Takahashi |
| 5,249,200 A | 9/1993 | Chen et al. |
| 5,293,402 A | 3/1994 | Crespo et al. |
| 5,293,405 A | 3/1994 | Gersbach et al. |
| 5,305,307 A | 4/1994 | Chu |
| 5,388,124 A | 2/1995 | Laroia et al. |
| 5,471,501 A | 11/1995 | Parr et al. |
| 5,633,863 A | 5/1997 | Gysel et al. |
| 5,646,958 A | 7/1997 | Tsujimoto |
| 5,856,970 A | 1/1999 | Gee et al. |
| 5,896,452 A | 4/1999 | Yip et al. |

(Continued)

FOREIGN PATENT DOCUMENTS

EP   0250048   12/1987

OTHER PUBLICATIONS

M. Tomlinson, "New Automatic Equaliser Employing Modulo Arithmetic", *Electonic Letters*, vol. 7, 1971, pp. 138-139.

(Continued)

*Primary Examiner* — Alexander Jamal
(74) *Attorney, Agent, or Firm* — Weide & Miller, Ltd.

(57) ABSTRACT

An analog transmit side crosstalk cancellation system is disclosed which is located at or near the connector of a communication channel, cable, or backplane. When configured as a connector, multiple signal paths are provided within the cancellation system. Input nodes and output nodes provide access into the connector of a received signal and out of the connector for processed signals. The crosstalk canceller comprises a delay, a filter, and an amplifier. These elements operate in conjunction to generate crosstalk cancellation signals. For a particular received signal, cancellation signals are combined therewith from one or more adjacent channels. The crosstalk cancellation system may be configured as part of a connector or an intermediary device between the communication device or card and conductors. The connector may be attached to the communication device or as part of the cable.

20 Claims, 5 Drawing Sheets

(56) References Cited

U.S. PATENT DOCUMENTS

| | | | |
|---|---|---|---|
| 5,909,466 A | | 6/1999 | Labot et al. |
| 6,052,420 A | * | 4/2000 | Yeap et al. ............... 375/346 |
| 6,088,827 A | | 7/2000 | Rao |
| 6,147,979 A | | 11/2000 | Michel et al. |
| 6,160,790 A | | 12/2000 | Bremer |
| 6,167,082 A | | 12/2000 | Ling et al. |
| 6,201,831 B1 | | 3/2001 | Agazzi et al. |
| 6,212,225 B1 | | 4/2001 | Agazzi |
| 6,226,332 B1 | | 5/2001 | Agazzi et al. |
| 6,236,645 B1 | | 5/2001 | Agazzi |
| 6,249,544 B1 | | 6/2001 | Azazzi et al. |
| 6,252,904 B1 | | 6/2001 | Agazzi et al. |
| 6,253,345 B1 | | 6/2001 | Agazzi et al. |
| 6,259,729 B1 | | 7/2001 | Seki |
| 6,272,173 B1 | | 8/2001 | Hatamian |
| 6,285,653 B1 | | 9/2001 | Koeman et al. |
| 6,297,647 B2 | | 10/2001 | Kirk et al. |
| 6,304,598 B1 | | 10/2001 | Agazzi et al. |
| 6,351,531 B1 | | 2/2002 | Tahernezhaadi et al. |
| 6,356,555 B1 | | 3/2002 | Rakib et al. |
| 6,433,558 B1 | | 8/2002 | Sciacero et al. |
| 6,463,041 B1 | | 10/2002 | Agazzi |
| 6,480,532 B1 | | 11/2002 | Vareljian |
| 6,489,913 B1 | * | 12/2002 | Hansen et al. ............ 341/156 |
| 6,493,448 B1 | | 12/2002 | Mann et al. |
| 6,553,085 B1 | | 4/2003 | Trans |
| 6,564,184 B1 | | 5/2003 | Eriksson |
| 6,584,160 B1 | | 6/2003 | Amrany et al. |
| 6,618,480 B1 | | 9/2003 | Polley et al. |
| 6,665,402 B1 | | 12/2003 | Yue et al. |
| 6,751,255 B1 | | 6/2004 | Reuven et al. |
| 6,792,038 B2 | | 9/2004 | Agazzi |
| 6,819,709 B1 | | 11/2004 | Agazzi et al. |
| 6,826,226 B1 | | 11/2004 | Sahlin et al. |
| 6,862,326 B1 | | 3/2005 | Eran et al. |
| 6,912,208 B2 | | 6/2005 | Zimmerman et al. |
| 6,934,345 B2 | | 8/2005 | Chu et al. |
| 6,961,373 B2 | | 11/2005 | Jones |
| 7,002,897 B2 | | 2/2006 | Jones et al. |
| 7,110,449 B2 | | 9/2006 | Heo et al. |
| 7,164,764 B2 | | 1/2007 | Zimmerman et al. |
| 7,187,719 B2 | | 3/2007 | Zhang |
| 7,257,181 B2 | | 8/2007 | Jones et al. |
| 7,664,172 B1 | * | 2/2010 | Manickam et al. ......... 375/232 |
| 2001/0036160 A1 | | 11/2001 | Curran et al. |
| 2002/0067824 A1 | | 6/2002 | Wang |
| 2002/0106016 A1 | | 8/2002 | Egelmeers et al. |
| 2002/0176492 A1 | | 11/2002 | Zangi et al. |
| 2002/0191552 A1 | | 12/2002 | Watkinson |
| 2003/0067888 A1 | | 4/2003 | Bina et al. |
| 2003/0099208 A1 | | 5/2003 | Graziano et al. |
| 2004/0001540 A1 | | 1/2004 | Jones |
| 2004/0022311 A1 | | 2/2004 | Zerbe et al. |
| 2004/0120508 A1 | * | 6/2004 | Sajadi et al. ............ 379/399.01 |
| 2004/0125487 A9 | | 7/2004 | Sternad et al. |
| 2004/0170230 A1 | * | 9/2004 | Zimmerman et al. ........ 375/285 |
| 2005/0025229 A1 | | 2/2005 | Jones et al. |
| 2005/0030884 A1 | * | 2/2005 | Kim et al. .................. 370/201 |
| 2005/0207561 A1 | * | 9/2005 | Hammond, Jr. ............. 379/351 |
| 2006/0154531 A1 | * | 7/2006 | Kim et al. .................. 439/676 |

OTHER PUBLICATIONS

Hiroshi Harashima, et al., "Matched-Transmission Technique for Channels with Intersymbol Interference", IEEE Transactions on Communications, vol. COM-20, No. 4, Aug. 1972, pp. 774-780.

Peter Kabal, et al., "Partial-Response Signaling", IEEE Transactions on Communications, vol. COM-23, No. 9, Sep. 1975, pp. 921-934.

Robert F. H. Fischer, et al. "Dynamics Limited Precoding, Shaping, and Blind Equalization for Fast Digital Transmission Over Twisted Pair Lines", IEEE Journal on Selected Areas in Communications, vol. 13, No. 9, Dec. 1995, pp. 1622-1633.

Robert F. H. Fischer, et al., "Comparison of Precoding Schemes for Digital Subscriber Lines", IEEE Transactions on Communications, vol. 45, No. 3, Mar. 1997, pp. 334-343.

Oscar Agazzi, et al., "10Gb/s PMD Using PAM-5 Trellis Coded Modulation", Broadcom, IEEE 802.3, Albuquerque, New Mexico, Mar. 6-10, 2000, 38 pages.

Jamie E. Kardontchik, "4D Encoding in Level-One's Proposal for 1000BAS-T", Advanced Micor Devices, Aug. 21, 1977—Rev. B, pp. 1-24.

Eric F. Haratsch, et al., "A 1-Gb/s Joint Equalizer and Trellis Decoder for 1000BASE-T Gigabit Ethernet", IEEE Journal of Solid-State Circuits, vol. 36, No. 3, Mar. 2001, pp. 374-384.

Mehdi Hatamian, et al., "Design Considerations for Gigabit Thernet 1000Bast-T Twisted Pair Transceivers", IEEE 1998 Custom Integrated Circuits Conference, pp. 335-342.

Gottfried Ungerboeck, "Trellis-Coded Modulation with Redundant Signal Sets", IEEE Communications Magazine, Feb. 1987, vol. 25, No. 2, pp. 5-21.

"Gigabit Ethernet Over Category-5", Copyright 2000-2001 Agilent Technologies, 12 pages.

M.P. Sellers, et al., "Stabilized Precoder for Indoor Radio Communications", IEEE Communications Letters, vol. 4, No. 10, Oct. 2000, pp. 315-217.

"Wirescope 350—Understanding ELFTEXT", © 2000 Ailgent Technologies, 2 pages.

David Crawford, "Adaptive Filters", © David Crawford 1996, pp. 1-5.

David A. Johns, et al., "Integrated Circuits for Data Transmission Over Twisted Pair Channels", IEEE Journal of Solid-State Circuits, vol. 32, No. 3, Mar. 1997, pp. 398-406.

Prof. David Johns, University of Toronto, "Equalization", © D.A. Johns 1997, 29 pages.

David Smalley, "Equalization Concepts: A Tutorial", Atlanta Regional Technology Center, Texas Instruments, Oct. 1994, pp. 1-29.

Shao-Po Wu, et al., "FIR Filter Design via Spectral Factorization and Convex Optimization", to appear as Chapter 1 of Applied Computational Control, Signal and Communications, Biswa Datta Editor, Birkhauser, 1997, pp. 1-33.

Richard D. Wesel, et al., "Achievable Rates for Tomlinson-Harashima Precoding", IEEE Transactions on Information Theory, vol. 44, No. 2, Mar. 1998, pp. 824-831.

Wolfgang H. Gerstacker, et al., "Blind Equalization Techniques for xDSL Using Channel Coding and Precoding", submitted to AEÜ Int. J. Electr.Commun.,. May 1999, pp. 1-4.

Chip Fleming, "A Tutorial on Convolutional Coding and Viterbi Decoding", © 1999-2002, Spectrum Applications, pp. 1-6.

"ELFTEXT—Introduction", Fluke Networks™, © 2000, pp. 1-2.

"Iowegian's dspGuru FIR FAQ Part 2: Properties", © 1999-2000 Iowegian International Corp., pp. 1-4.

"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", IEEE Std. 802.3, 1998 Edition, pp. 6-14 and 18-44.

Definition of Minimum Phase; www.ccrma.stanford.edu/-jos/filters/definition_Minimum_Phase.html, 3 pages.

Li,M., et al., "FIR filter optimization as pre-emphasis of high-speed backplane data transmission", Electronics Letters, Jul. 8, 2004; vol. 40, No. 14.

Analog Devices; Background Information about wireless communications; Date unknown; Http://re.rfglobalnet.com/library/applicationnotes/files/7bginfo.htm.

P.M. Crespo Bofill, G. Shing Liu, C. Ho Wei; "Combine Baud-rate Timing Recovery and Adaptive Equalization for High Rate Data Transmission in Digital Subscriber Lines"; Communicaciones de Telefonica y Desarrollo; vol. 41, No. 7, Jun. 1993; http://www.tid.es/presencia/publicaciones/comsid/es/articulos/vol41/comi/combi.htm.

* cited by examiner

ANALOG TRANSMIT CROSSTALK CANCELLER

PRIORITY CLAIM

This application claims priority to Provisional Patent Application No. 60/797,598 entitled Analog Transmit Crosstalk Canceller which was filed May 4, 2006.

FIELD OF THE INVENTION

The invention relates to communication systems and in particular to a method and apparatus for canceling crosstalk using transmit side processing.

BACKGROUND

Communication systems often transmit communication signals between stations or remote locations. The different locations may be remote locations or as close as a foot apart in a backplane environment. The communications signals are often transmitted over metallic conductors, hereinafter lines, which are often located in close proximity. The proximity of the lines are particularly close when a high density connector is utilized to connect multiple lines to the communication system.

Crosstalk coupling between lines occurs when an electromagnetic field generated by a signal in one line couples into and becomes part of a signal in another line. Crosstalk is generally understood to be unwanted and undesirable. In some systems the primary source of contact is the mechanical assembly consisting of the PCB/connector/cable launch or vice versa (cable to PCB) and can be considered as the end point. Alternatively, crosstalk couples between lines based on the parameters of the signal on the line and the proximity of the lines. Either or both sources can dominate depending on the system. As a result, signals in proximately located lines will contain unwanted crosstalk coupling from other nearby lines.

The invention disclosed herein overcomes the drawbacks of the prior art by providing a method and apparatus for crosstalk cancellation.

SUMMARY

To overcome the drawbacks of the prior art and to provide additional advantages as disclosed herein, an analog transmit side crosstalk cancellation system is disclosed, which may be located at or near the connector of a communication channel, cable, or backplane. In one embodiment, a transmit side crosstalk cancellation system is contained within a connector and comprises a delay configured to receive and delay a first communication signal from a first line of the communication system to create a delayed signal. An analog filter then receives and filters the delayed signal to create a filtered signal while an amplifier receives and amplifies the filtered signal to create a cancellation signal. A junction is also provided to combine the cancellation signal with a second communication signal on a second line of the communication system such that the first line and the second line are adjacent in a connector.

In one embodiment the crosstalk cancellation system is part of a connector of a communication cable. It is also contemplated that the connector may be part of a circuit board connector or part of a backplane. The system may also comprise a third line which is not adjacent to the first line such that a signal on the third line is not utilized to create a cancellation signal to be combined with the signal on the second line. In one embodiment, the crosstalk cancellation system is contained within a separate element and configured for use between the communication system and the connector. The second communication signal receives cancellation signals from each adjacent conductor in the connector.

Also disclosed herein is a connector configured with a crosstalk cancellation system. In one example embodiment the connector comprises an outer housing such that, the housing has an outer insulative cover, and a first opening and second opening. Also part of this system is two or more input nodes at the first opening which are configured to each receive a signal, and at least one crosstalk cancellation system associated with each node. The cross talk cancellation system is configured to process the signal at the node to generate a crosstalk cancellation signal. The system further comprises at least one junction associated with each crosstalk cancellation system configured to combine each received signal with at least one crosstalk cancellation signal to create two or more crosstalk canceled signals. Two or more output nodes at the second opening in the housing are each configured to present one of the two or more crosstalk canceled signals out of the connector.

In one embodiment, the crosstalk cancellation system comprises a delay and a filter. It is contemplated that the crosstalk cancellation system may further comprise an amplifier which may increase or decrease the magnitude of the crosstalk cancellation signal. In one embodiment the connector is attached to or is part of a communication cable or a backplane.

In this example embodiment, at least one of the junctions is configured to combine a cancellation signal from the crosstalk cancellation system that is associated with each adjacent node. In such a configuration, the term adjacent comprises only vertically adjacent and horizontally adjacent. In addition, the term adjacent may further comprise diagonally adjacent.

Also disclosed herein is a method for canceling crosstalk within or at a connector. The steps of such a method comprise receiving, from a communication system, a first signal, a second signal, and a third signal. The signals are carried on a first conductor, a second conductor, and a third conductor respectively and the first conductor is adjacent the third conductor and the second conductor is adjacent the third conductor. The method delays the first signal to create a delayed first signal and delays the second signal to create a delayed second signal. Then, the method filters the first delayed signal with an analog filter to created a first filtered signal and filters the second delayed signal with an analog filter to created a second filtered signal. Amplifying of the first filtered signal creates a first cancellation signal and amplifying the second filtered signal to create a second cancellation signal. Thereafter, combining occurs wherein the first cancellation signal and the second cancellation signal are combined with the third signal to cancel crosstalk from the first signal and crosstalk from the second signal into the third signal. This creates a processed third signal which is output to a connector or to a communication cable.

This method may occur in a communication cable connector. In one variation of this method, the step of outputting the processed third signal to a connector or to a communication cable comprises outputting the processed third signal to a backplane. In operation, the method may occur between all adjacent conductors of a connector.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
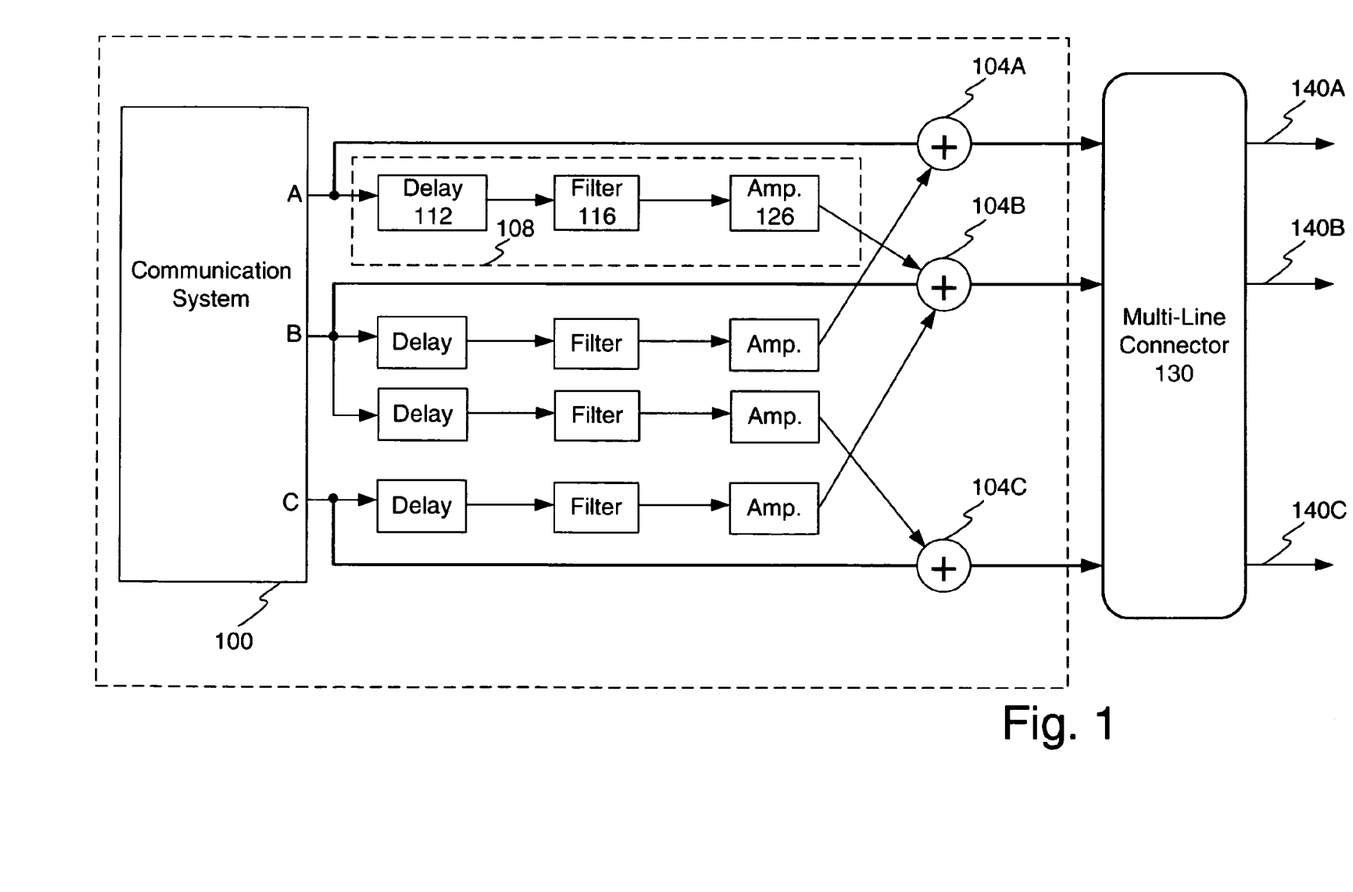
FIG. 1 illustrates an example block diagram of a communication system with a transmit side crosstalk pre-cancellation system as part of the communication system.

To overcome the drawbacks of crosstalk coupling and prior art solutions, disclosed herein is a method and apparatus for crosstalk cancellation. FIG. 1 illustrates an example embodiment of a communication transmit system with crosstalk cancellation. In this example embodiment the crosstalk cancellation system is configured at part of the transmitter portion of the communication system. In this sense, it pre-cancels crosstalk prior to the signal traveling through the channel.

This provides numerous benefits over prior art receiver side cancellation. At the transmitter, the signal power levels are at their highest, and coupling can occur within or near the connector. In addition, crosstalk which couples at or near the transmitter is subject to medium frequency response of the channel. This distortion makes receiver side crosstalk cancellation more difficult. Receiver side cancellation also requires large delays which are based on or related to the transmission line length. Such delays are difficult to implement and consume additional space. This cancellation system may thus pre-distort the transmitted signal with cancellation signal to thereby cancel coupling which will occur during transmission. In addition, dynamic adaptation may not be necessary if the crosstalk coupling does not change over time.

As shown in FIG. 1, a communication system 100 may comprise any type communication system configured to provide a communication signal for transmission over the channel. In one embodiment the communication system comprises a cables consisting of twin-axial cable with high-density connectors or PCB backplane connectors. The output of the communication system 100 is provided directly to a summing or subtracting junction 104A, 104B and 104C as shown. The output of the communication system 100 is also provided to a crosstalk cancellation system 108 as shown within the dashed line.

The crosstalk cancellation system 108 comprises a delay element 112, a filter 116, and an amplifier 120 as shown. The elements 112, 116, and 120 are configured in serial manner. The delay 112 is configured to delay the output communication signal by an amount that matches the delay resulting from the signal delay between the output of the crosstalk canceller to the main source of crosstalk. This may be, in typical embodiments crosstalk occurring in or on the path of the equalizer IC, package, the PCB to the male and female high-density connectors and/or the interface [splice point] between the connector of the cable. The delay may conceptually be positive or negative or measured from any reference point or reference time. It is contemplated that a delay element may also be placed in the path of the primary signal, such as between element 100 and 104 so that the outgoing signal may be delayed to account for any delays in the cancellation system 108. The delay(s) 112 can be part of the CDR based on a DLL approach.

The filter 116 is configured to modify the communication signal in such a manner that the output of the filter comprises the signal having spectral content generally similar or related to the crosstalk that couples to the nearby line. In FIG. 1, the processing by filter 116 is performed to generate a crosstalk cancellation signal having spectral content that will cancel crosstalk that couples from channel A into channel B. The filter may comprise a high pass filter. The filter 116 may comprise an inverse filter such as a programmable analog filter with 20 to 30 dB of gain.

The output of the filter 116 feeds into the amplifier 120 which is configured to amplify or attenuate the signal output from the filter to a magnitude that matches the crosstalk coupling from the channel A to channel B. The amplifier 120 may comprise any type amplifier configured to amplifier a signal. The amplifier may be inverting or non-inverting as may be warranted to cancel the crosstalk. For example, if a summing junction is utilized, then an inverting amplifier may be appropriate to create an inverted cancellation signal that subtracts, from the signal, the coupling that will occur. The gain may be set to compensate for connector losses.

The output of the amplifier is the crosstalk cancellation signal and is provided to the summing junction 104B. The junction 104B combines the cancellation signal, such as from an inverting amplifier, from the outgoing communication signal on channel B. If the junction 104 performs subtraction, then the junction may comprise a combination node and the cancellation signal may not be inverted by the amplifier 120. It is contemplated that the correction or cancellation signals may be AC coupled to an output buffer. This eliminates the need for custom designed linear output buffers.

The output of the summing junction may connect to a driver (not shown) and eventually to connectors, such as multi-line connector 130. The connector is electrically linked to a line 140. The other lines, B and C, function in a similar manner. In one embodiment, if the output driver has pre-emphasis and or de-emphasis, the pre/de-emphasis signal may or may not be added to the crosstalk signal. This may depend on the amplitude and freq. content of the pre/de-emphasis. For example, pre/de-emphasis may occur prior to or within element 100, in which case the pre/de-emphasis would feed into the crosstalk cancellation system 108. For example, pre/de-emphasis may occur after element 104 but may be small, in relation to the overall outgoing signal, and hence create only a small amount of crosstalk and not warrant cancellation. The pre/de-emphasis may or may not need to be corrected for by crosstalk cancellation.

FIG. 1 shows the cancellation signal as being generated to cancel crosstalk from only adjacent lines. Hence, line A is adjacent to only line B and hence only generates a cancellation signal to cancel coupling from line A to line B. Likewise, line B is adjacent to line A and line C and hence generates a cancellation signal for lines A and C. It is contemplated that any arrangement of cancellation may occur between the various lines. It is contemplated that many lines may be in the system and as such, there is no limit on the number of line that can be in the connector or communication system. Moreover, any number of the lines, which are in the connector or communication system, may be involved in the crosstalk cancellation operation.

The cancellation system 108 must be tailored to process the signal in a manner that will result in a crosstalk cancellation signal, i.e. a signal the cancels the crosstalk that couples from nearby channels. As such the amount of delay, and spectral effect of the filtering, and the level of amplification must be adjusted to match the amount of crosstalk that couples. As such the delay 112, filter 116, and amplifier 120 may be adjusted based on testing that occurs when the system is installed, or based on testing that occurs in the lab or during design. Adaptation may also occur, either during training or during operation.

Figure 4A:
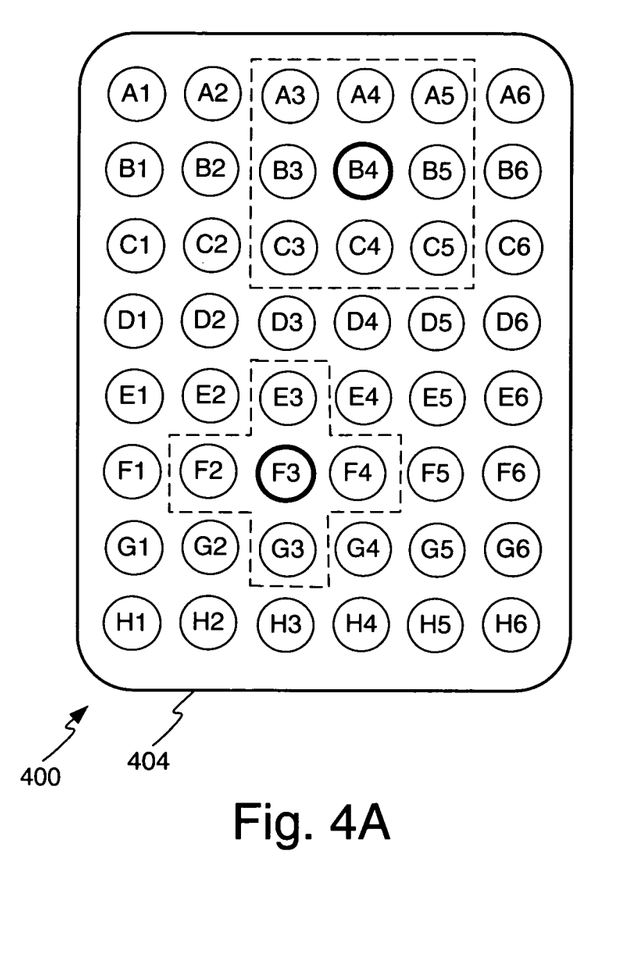
FIGS. 4A and 4B illustrate a connector line location diagram showing possible crosstalk cancellation patterns.
Figure 4B:
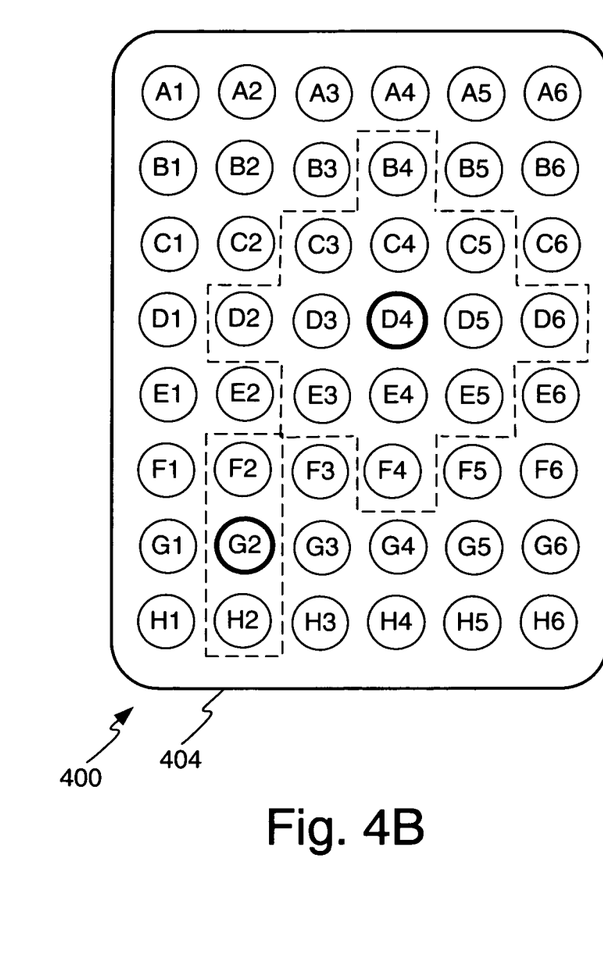

In one embodiment the close proximity of the lines in the connector 130 is the primary source of the crosstalk coupling and as such, the crosstalk that couples from the connector is measured. The processing by the delay 112, filter 116, and amplifier 120 is selected to counter the crosstalk coupling that results from the close proximity of the lines in the connector. In such an embodiment, the cancellation system 108 is considered to account for connector crosstalk. In a connector, such as generally shown in FIGS. 4A and 4B which is discussed below, this may significantly reduce signal degradation.

It is further contemplated that the cancellation system 108 may be configured with analog elements. As a result, the power savings, as compared to a digital implementations, is a benefit. Reductions in power consumption also reduce heat generation. For example, a digital implementation of the filter 116 may require a multiple stage FIR filter while an analog implementation may only use a low power $1^{st}$ or $2^{nd}$ order passive or low power filter.

As a further benefit to this design, by performing crosstalk cancellation at the transmitter, the crosstalk that is pre-canceled at the transmitter prior to transmission of the signal, does not travel through the channel. As such, the crosstalk coupling is not also affected by the channel, which may cause the crosstalk and the signal itself to become more difficult to remove or recover at the receiver. For example, at the transmitter, the cancellation system can clearly 'know' the coupling signal because the signal that generates the coupling signal is adjacent or near the victim signal and hence, the cancellation signal may be created.

Yet another advantage to the method and apparatus described herein is that the analog filters may be simpler to construct and tune as compared to a digital filter. This results in cost, size, and efficiency savings. In addition, this configuration provides low power dissipation. In addition, once the cancellation system is established to compensate for the connector, the input length and characteristics will not affect the setting and there is no lock and configuration time.

Figure 2:
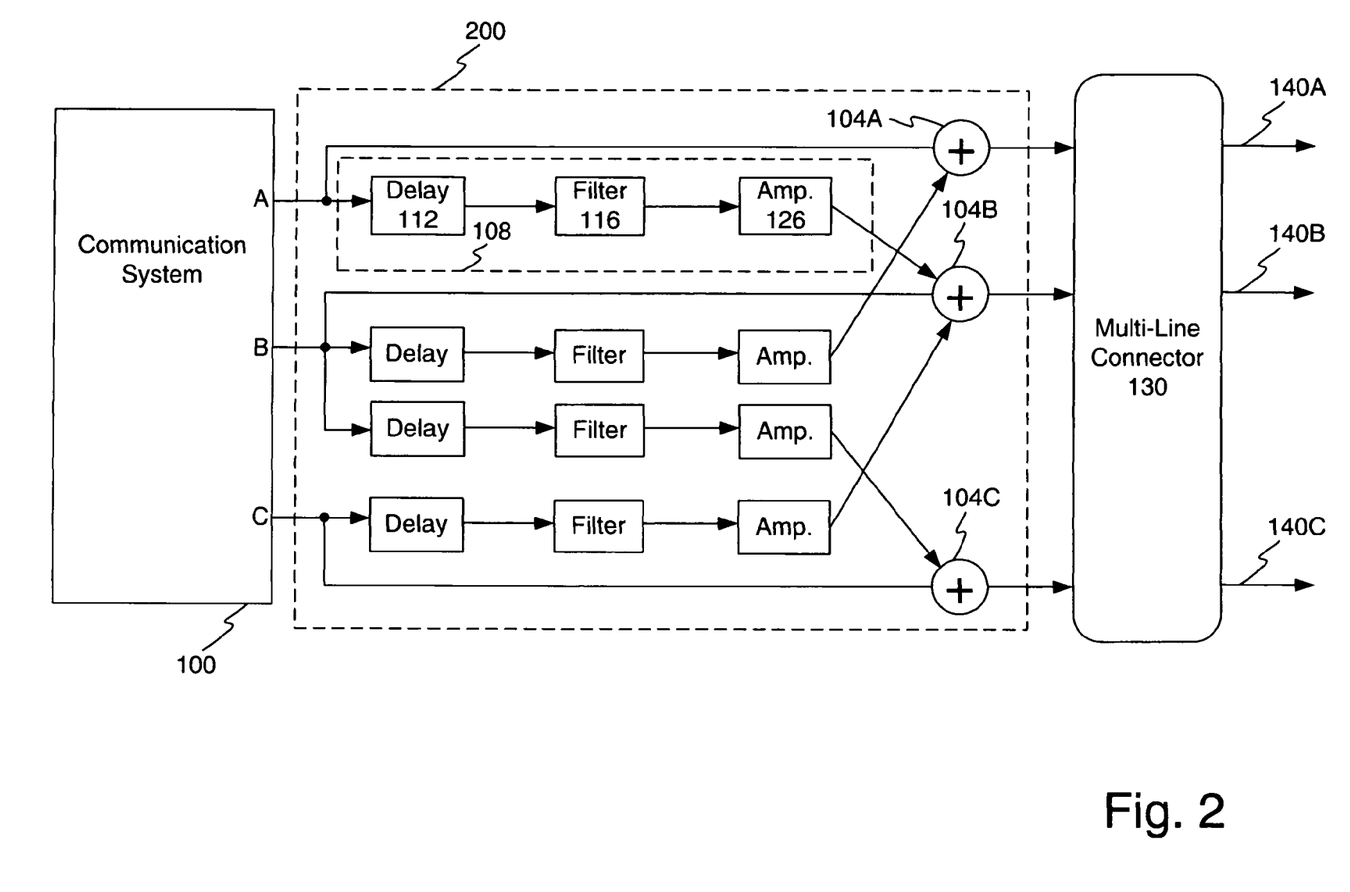
FIG. 2 illustrates an example block diagram of a communication system with a transmit side crosstalk pre-cancellation system as a separate element.

FIG. 2 illustrates an example block diagram of a communication system with a transmit side crosstalk pre-cancellation system as a separate element. As compared to FIG. 1, identical or similar elements are identified with common reference numbers. To avoid repetition, only the aspects of FIG. 2 which differ from FIG. 1 are discussed. In this embodiment, the crosstalk cancellation system is contained within a separate element 200 and located between the communication system 100 and the connector 130. In this configuration the cancellation system 200 may be configured separate from the communication system and connector and configured based on the communication system, communication signals, and the connector. Hence, it may be tailored to fit the particular environment of use to be adjustable for various parameters.

Figure 3:
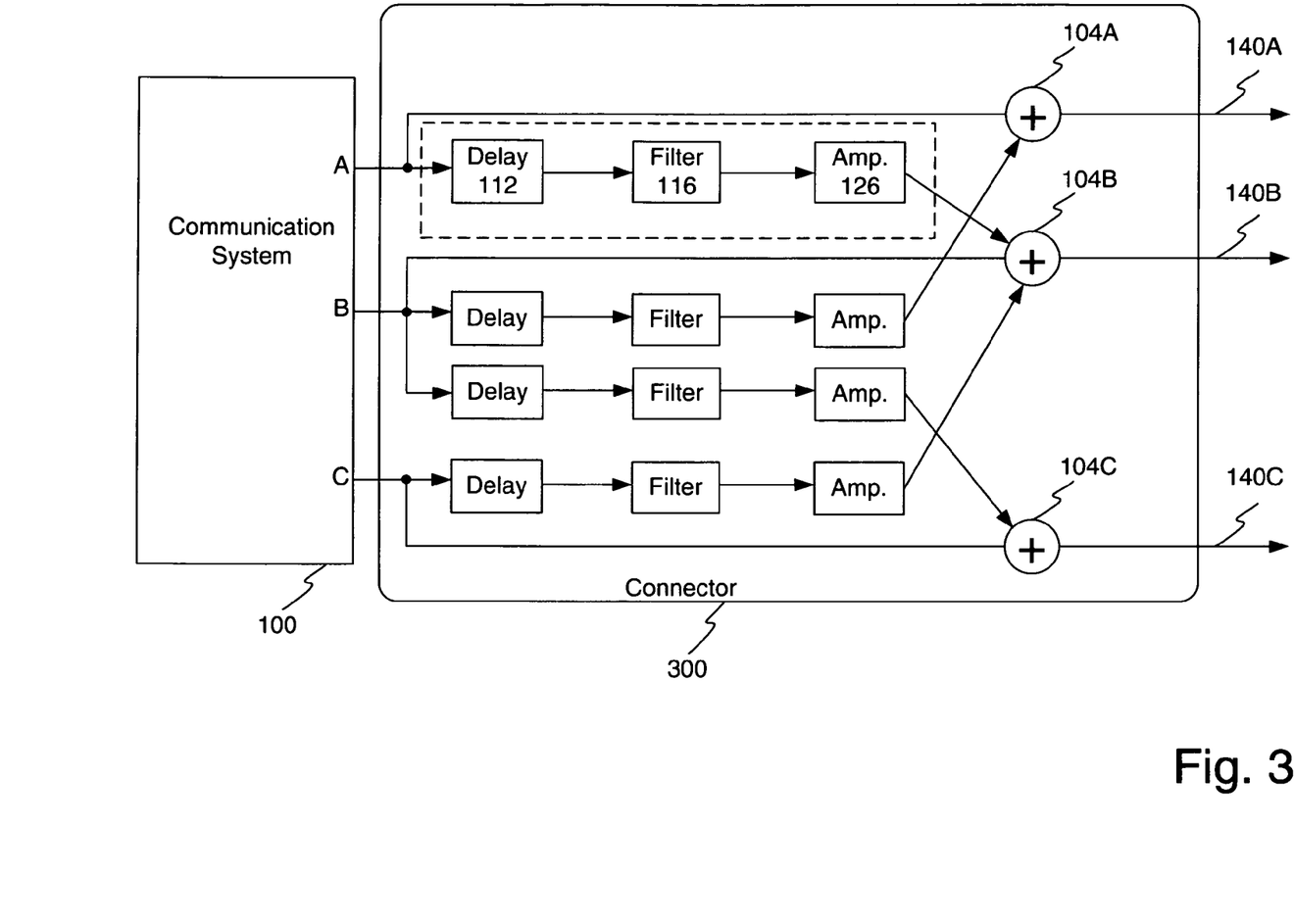
FIG. 3 illustrates an example block diagram of a communication system with a transmit side crosstalk pre-cancellation system as part of the multi-line connector.

FIG. 3 illustrates an example block diagram of a communication system with a transmit side crosstalk pre-cancellation system configured as part of the multi-line connector. As compared to FIG. 1, identical or similar elements are identified with common reference numbers. To avoid repetition, only the aspects of FIG. 3 which differ from FIG. 1 are discussed. In this embodiment, the crosstalk cancellation system is contained within and is part of the connector 300. As such, the amount and type of crosstalk cancellation may be tailored to the particular connector in use and automated to automatically work with the connector. This simplifies operation and installation by having, in the field, the same elements, but with the connector containing an integrated cancellation system. It is contemplated that the connectors may be cascaded to provide additional cancellation or cancellation for multiple cable paths in the case of stacked connectors.

FIGS. 4A and 4B illustrate a line location diagram within a multi-conductor connector showing possible crosstalk cancellation patterns. These figures are provided to aid in understanding and hence, connector configuration and/or cancellation patterns should not be limited to this particular arrangement. In FIG. 4A, an outer housing 404 of a connector 400 is shown with multiple conductors A1 through H6 as shown. As can be appreciated, certain conductors are closer to some conductors than other conductors. With reference to conductor B4, the closest conductors are conductors A3-A5, B3 and B5, and C3-C5. These conductors are shown within the dashed line around conductor B4. As a result, in one example embodiment, the crosstalk cancellation system is configured to cancel cross talk coupling that occurs across these lines, namely, from the signal on conductors A3-A5, B3 and B5, and C3-C5 into conductor B4. The patterns of crosstalk cancellation amongst adjacent conductors in the connector 400 can be repeated throughout the pattern of the connector.

Another example crosstalk cancellation pattern is shown around conductor F3. In this crosstalk cancellation pattern, the crosstalk cancellation system may be configured to only cancel crosstalk coupling from conductors with the dashed line, namely, conductors E3, F2, F4, and G3. Of course, it is contemplated that this pattern be repeated throughout the conductor 400.

FIG. 4B also illustrates a connector 400 with an outer housing 404 configured with multiple conductors. Depending on the level of crosstalk cancellation the pattern shown by the dashed line may be included and repeated for crosstalk cancellation around conductor 4D and other conductors. Any pattern of crosstalk cancellation may be established between conductors in the connector 400.

FIG. 4B also shows a possible cancellation pattern around conductor (or pin) G2. In this example, a vertical shield exists between columns (not a significant source of jitter) so the crosstalk cancellation coupling occurs between the conductor G2 and the adjacent top (F2) and adjacent bottom (H2). Hence, the cancellation system could cancel, on a repeating basis, crosstalk coupling from adjacent conductors that are above and below.

Figure 5:
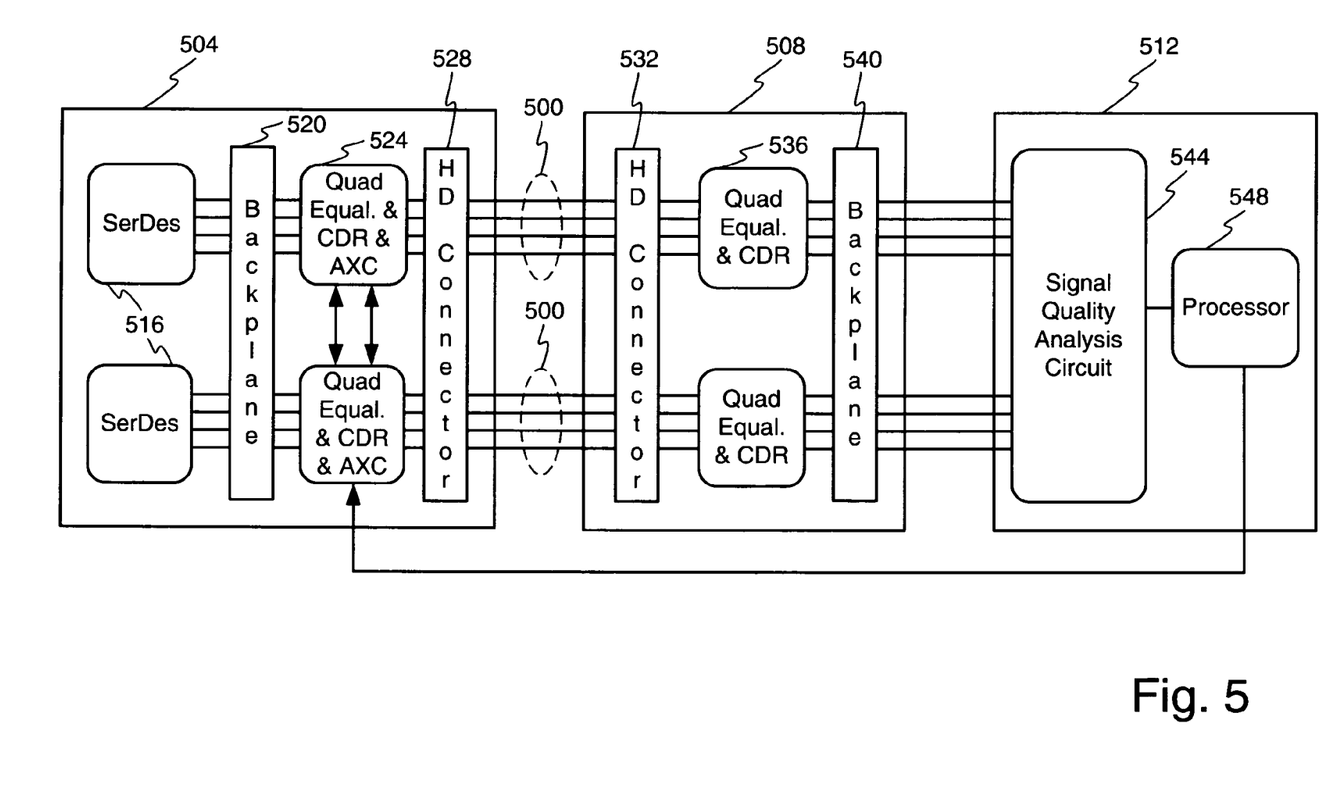
FIG. 5 illustrates an example block diagram of an adaptable crosstalk cancellation system.

FIG. 5 illustrates a block diagram of an adaptable crosstalk cancellation system. As shown in FIG. 5, communication cables 500 connect the various communication elements. In one embodiment the top set of cables 500 carry signals traveling in a first direction, while the bottom set of cables 500 carry signal traveling in a second and opposite direction. In this embodiment, a first processing block 504 communicates with a second processing block 508 as shown. Also part of the system is a removable adaptation block 512, which may be configured as a bus or backplane connected card. The adaptation block 512 may comprise a test card.

In this embodiment the first block 504 comprises a serializer/deserializer (SerDes) 516 configured to perform data conversion processing on the data. The serializer/deserializer is generally understood in the art and hence not described in detail. The SerDes 516 communicates over a backplane 520 with a quad equalizer with CDR and AXC module 524 as shown. The equalizer component may comprise a low noise equalizer, filter, or any other similar or related device. In this embodiment the analog crosstalk canceller (AXC) is part of element 524. In other embodiments the AXC may be part of the connector 528. The AXC may be located at any location in the system or connector shown in FIG. 5 to achieve the cancellation as described herein.

In turn, element 524 communicates through a high density connector 528 to the second module 508. In this embodiment the second module 508 receives and exchanges data with the first module 504 through an opposing high density connector 532 which in turn feeds into a quad equalizer with CDR module 536. The output of element 536 connects to the backplane 540, which in turn provides the signals on cables 500 to the adaptation block 512.

In this embodiment the adaptation block 512 comprises a signal quality analysis circuit 544 and a processor 548 connected as shown. The processor 548 connects to the first processing block 504 as shown or in any other manner via any path to provide adaptation signals. In general, the signal quality analysis circuit 544 comprises a circuit that is capable of measuring one or more aspects of signal quality of signal error. In one embodiment circuit 544 comprises a 16×16× Point signal conditioner available from Mindspeed Technologies Inc, of Newport Beach, Calif. Signal quality or error may comprise the eye opening, alignment, signal contour, slicer error, or any other factor. This information is provided to the processor 548, which is configured with software to processes the signal quality or error information to generate one or more configuration settings (adaptation signal) for the analog crosstalk canceller as found in element 524. Any type processor, controller, or processing logic may be utilized.

In general during operation the analog crosstalk canceller as contained in element 524 or a connector. It is configured to cancel crosstalk and operate as defined herein. In this embodiment, at startup, during configuration, periodically during operation, or at any other time, an adaptation operation may occur. The adaptation operation may occur when the signals on the bus 500 are received at the signal quality analysis circuit 544. The signal quality analysis circuit 544 processes the signal to determine one or more aspects of the signal, such as comparison to known transmitted signals, or based on a slicer or quantizer output, or in any other manner, to obtain an indication of aspects of the received signals or received signal quality. In one embodiment, the received signal is compared to a known transmitted version of that signal to isolate or identify crosstalk coupling from one or more of the nearby cables or connector pins into a victim channel. This information is then passed onto the processor 548, which in this embodiment is configured to generate one or more adaptation signals which are forwarded to the analog crosstalk cancellers of element 524.

These adaptation signals may comprise canceller settings or other data which is used by the analog crosstalk canceller to establish the operating parameters for the analog crosstalk canceller. By way of example, but not limitation, the adaptation signal may comprise data that controls or sets one or more of the following: delay values or amounts, filter coefficients or filter parameters, amplifier or attenuation levels, switch selection, summation junction behavior, or any other analog crosstalk canceller parameter or setting. In this manner, the adaptation signals custom tailor the analog crosstalk canceller settings to optimally cancel the actual crosstalk coupling between signals traveling on through connectors and cables 500 thereby improving the accuracy of the analog crosstalk canceller. It is also contemplated that the adaptation signals may be generated by the processor 548 and manually entered by a technician in to the analog crosstalk canceller.

It is contemplated that the adaptation block may comprise a bus connected card or module that is maintained in the communication device, or selectively inserted for adaptation. Thus, the adaptation may occur constantly, or intermittently. In certain environments of use, crosstalk in an established system will not change over time, or if changes do occur, the changes in crosstalk coupling will be small. This is unlike a CO to CPE communication link subject to numerous dynamic crosstalk offenders during thousands of feet communication link. Therefore, in one embodiment, adaptation may occur initially at set up, and the module 512 removed from the system. The custom tailored analog crosstalk canceller settings established during adaptation may not need to be adapted during operation because in certain systems the crosstalk coupling will not change over time.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A transmit side crosstalk cancellation system which is separate from a communication system and separate from a connector of a channel, the system configured to be between the communication system and the connector and comprising:
   a delay element configured to receive a first communication signal from a first line of a communication system and delay the first communication signal to create a delayed signal;
   an analog filter configured to receive and filter the delayed signal to create a filtered signal;
   an amplifier configured to receive and amplify the filtered signal to create a cancellation signal; and
   a junction configured to combine the cancellation signal with a second communication signal on a second line of the communication system, wherein the first line and the second line are adjacent in the connector;
   an outer housing configured to contain separate from the communication system and separate from connector the delay element, the analog filter, the amplifier and the junction and further configured with an input configured to electrically connect to and disconnect from the communication system and an output configured to electrically connect to and disconnect from the connector which connects to the channel, such that the outer housing is configured to connect between the communication system and the connector.

2. The system of claim 1, wherein the crosstalk cancellation system is part of a connector that connects to a communication cable.

3. The system of claim 1, wherein the connector attaches to a circuit board connector.

4. The system of claim 1, wherein the connector is part of a backplane.

5. The system of claim 1, further comprising a third line which is not adjacent to the first line and a signal on the third line is not utilized to create a cancellation signal to be combined with the second communication signal on the second line.

6. The system of claim 1, wherein the crosstalk cancellation system is contained within a separate element and configured for use between the communication system and a connector of a communication cable.

7. The system of claim 1, wherein the second communication signal receives cancellation signals from each adjacent conductor in the connector.

8. A connector containing a crosstalk cancellation system, the cancellation system connector comprising:
   an outer housing, the outer housing containing the crosstalk cancellation system and comprising an outer insulative cover, and a first opening and second opening, the outer housing configured separate from a communication system and a channel connector;
   two or more input nodes at the first opening configured to be electrically connectable and disconnectable from an output connector of a communication device to each receive a signal;
   at least one crosstalk cancellation system associated with each node, wherein the at least one cross talk cancellation system is configured to process the signal at the node to generate at a crosstalk cancellation signal;
   at least one junction associated with each crosstalk cancellation system configured to combine each received signal with at least one crosstalk cancellation signal to create two or more crosstalk canceled signals; and
   two or more output nodes at the second opening in the housing each configured to present one of the two or more crosstalk canceled signals out of the connector to a communication cable or a communication cable connector, wherein the connector is configured with the two or more input nodes and the two or more output nodes to connect between the communication system and the channel connector.

9. The connector of claim 8, wherein the crosstalk cancellation system comprises a delay and a filter.

10. The connector of claim 9, wherein the crosstalk cancellation system further comprises an amplifier which may increase or decrease the magnitude of the crosstalk cancellation signal.

11. The connector of claim 8, wherein the connector is attached a communication cable.

12. The connector of claim 8, wherein the connector is attached a backplane.

13. The connector of claim 8, wherein the connector attaches to a communication cable.

14. The connector of claim 8, wherein the at least one junction is configured to combine a cancellation signal from each adjacent node.

15. The connector of claim 14, wherein adjacent comprises only vertically adjacent and horizontally adjacent.

16. The connector of claim 15, wherein adjacent further comprises diagonally adjacent.

17. A method for canceling crosstalk within or at a connector comprising:
   attaching a connector to a communication system by placing the connector into an output of the communication system, wherein the connector includes at least one delay, at least one filter, and at least one amplifier;
   attaching a channel connector to the connector, the connector located between the communication system and the channel connector and configured within a separate element from the communication system and the channel connector;
   receiving at the connector configured to cancel crosstalk, from the output of the communication system, a first signal, a second signal, and a third signal, wherein the first, second, and third signals are carried on a first conductor, a second conductor, and a third conductor respectively, and the first conductor is adjacent the third conductor and the second conductor is adjacent the third conductor;
   delaying the first signal to create a delayed first signal;
   delaying the second signal to create a delayed second signal;
   filtering the first delayed signal with an analog filter to created a first filtered signal;
   filtering the second delayed signal with an analog filter to created a second filtered signal;
   amplifying the first filtered signal to create a first cancellation signal;
   amplifying the second filtered signal to create a second cancellation signal;
   combining the first cancellation signal and the second cancellation signal with the third signal to cancel crosstalk from the first signal and crosstalk from the second signal into the third signal to create a processed third signal; and
   outputting the processed third signal to the channel connector that is connected to a communication cable.

18. The method of claim 17, wherein outputting the processed third signal to the channel connector comprises outputting the processed third signal to a backplane.

19. The method of claim 17, wherein this method occurs, between all adjacent conductors, within channel connector for the cables consisting of a communication cable or a backplane.

20. The method of claim 17, further comprising attaching the channel connector of a communication cable to the connector that is attached to the output of the communication system thereby establishing the connector in electrical connection between the communication system and the connector of the communication cable.

* * * * *